Figure 1:
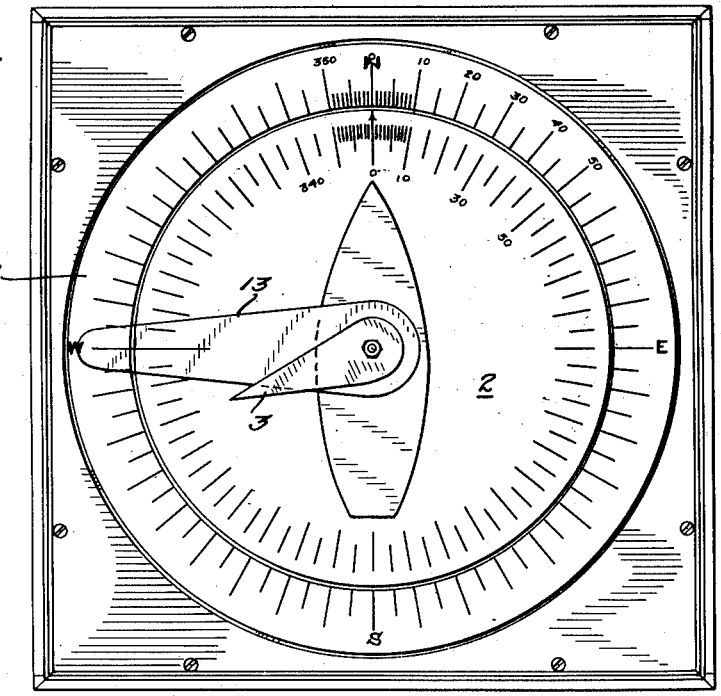

July 7, 1953  J. W. HORTON ET AL  2,644,244
ORIENTATION MECHANISM
Filed April 9, 1943  2 Sheets-Sheet 1

INVENTORS
J. WARREN HORTON
ROBERT A. WAGNER
BY
ATTORNEY

July 7, 1953 J. W. HORTON ET AL 2,644,244
ORIENTATION MECHANISM
Filed April 9, 1943 2 Sheets-Sheet 2

INVENTORS
J. WARREN HORTON
ROBERT A. WAGNER
BY
ATTORNEY

Patented July 7, 1953

2,644,244

UNITED STATES PATENT OFFICE 2,644,244

ORIENTATION MECHANISM

Joseph Warren Horton, Ipswich, and Robert A. Wagner, Worcester, Mass., assignors to the United States of America as represented by the Secretary of the Navy Application April 9, 1943, Serial No. 482,500

7 Claims. (Cl. 33—226)

This invention relates to the control of trainable devices on ships or other carriers and to a bearing indicator therefor. It is desirable that the operator of such a device which may include, by way of example rather than limitation, underwater sound projectors and receivers, directional antennae, search lights, guns, etc., shall be able to alter its orientation at will and that it shall otherwise be controlled automatically. The object, generally stated, is to simplify the control mechanism. Specifically the invention provides a compact gearing and dial arrangement which enters into the control of the trainable device and gives accurate and readily observable indications of the ship's orientation and of the true and relative bearings of the trainable device.

Where the trainable device is to be trained on a moving or relatively obscure target, it is difficult to bring it to bear upon the target, and still more difficult to keep it trained upon the target. To this is added the change brought about by motion of the ship, particularly as it changes its course. In the usual case it is necessary for the operator of such a device to transmit the information which he obtains to other persons who are in a position to make use of it. This requires that he be able to read both the true and the relative bearings of the device upon convenient scales and it is obviously also desirable that he be able to read the true bearing of the ship itself so that he will be continuously informed of changes in the ship's course.

When the steering of the ship and the training of the device are both accomplished by remotely-controlled motor drives, it is apparent that a time delay will be involved in both cases between actuation of the control means and actual changes in orientation. The mechanism of the invention is therefore arranged to be actuated not directly by the control handle, compass and trainable device as they turn on the ship but by driving means which respond to such turning movements.

In the training indicators now commonly employed there is provision for reading the relative bearing of the trainable device by means of a fixed azimuth scale and a train indicator, but the true bearing can be determined only by reading a course repeater and the train indicator simultaneously. It is thus of the greatest importance that operators be thoroughly drilled in keeping on the approximately true bearing of the target during the changes in the ship's course. Failure of operators to keep the trainable device on the true bearing of the target is one of the most frequent causes of lost contact with the target.

In the case of certain trainable devices to which the invention is particularly applicable, it requires a statistical comparison of an appreciable number of settings to determine the bearing. The correct bearing can be determined only by trial and error; it necessitates the comparison of a number of observations, each of which must be associated with a position on the true bearing scale. With such prior equipment the true bearing of the trainable device is a function of the ship's heading as well as of the adjustment of the training control. The statistical averaging, therefore, has to be made in terms of a moving true bearing scale, controlled by the ship's gyrocompass. It is essential that the operator constantly keep this moving scale under observation and that he manipulate the training control in such manner as to swing the bearing indicator over some significant portion. This, then, imposes two burdens on him; one of observation and one of manipulation. This lessens the effective accuracy of the equipment, and increases the time required to obtain significant bearing readings and the difficulty of retaining a target once it has been located.

With such equipment there is no certain relation between the angle through which the training control wheel is displaced and the resulting angle through which the trainable device is moved relative to the target. It would be preferable if the operator could know that some given angular motion of the control wheel would result in some definite change in the orientation of the trainable device.

In the training control mechanism in accordance with the invention, the repeater from the ship's compass, as well as the manually operated control are connected to separately movable elements of a follow-up device, this joint connection being effected by a differential gear train. With this arrangement any change in the ship's heading, whether resulting from a change in course or from yawing, causes an equal and opposite relative motion of the trainable device and thus preserves a fixed true bearing. The manual control, therefore, becomes a control of true, rather than of relative, bearing. The operator can now make some desired change in true bearing by rotating the control wheel through a predetermined angle, without having to watch either the bearing scales or the control wheel. The design is preferably so chosen that one revolution of the control wheel causes the true bearing of the trainable device to change five degrees. This has been found to be a convenient relation, both for initial searching and for obtaining the necessary statistical average once the target has been located.

Figure 2:
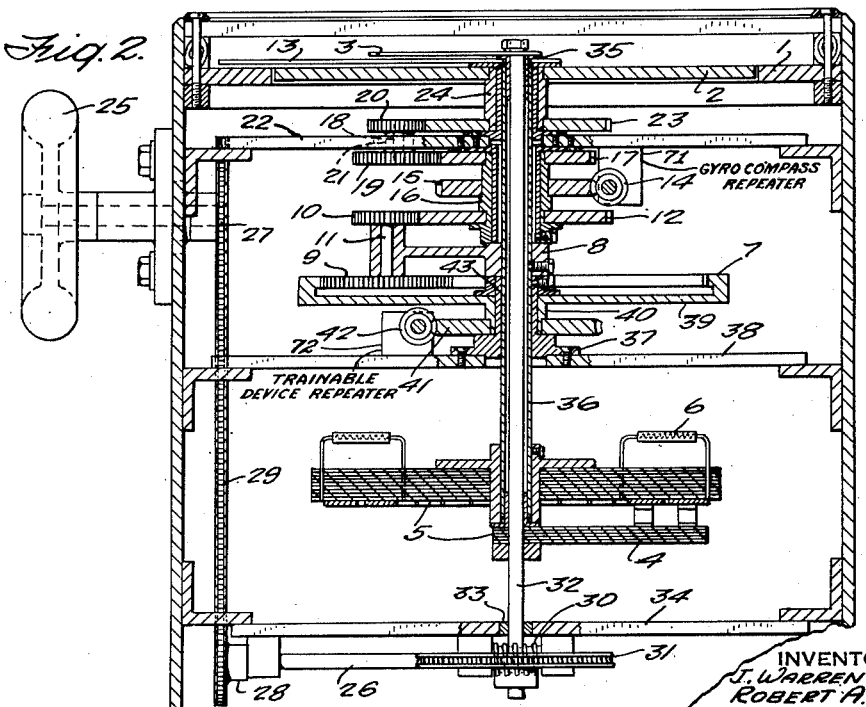
Figure 3:
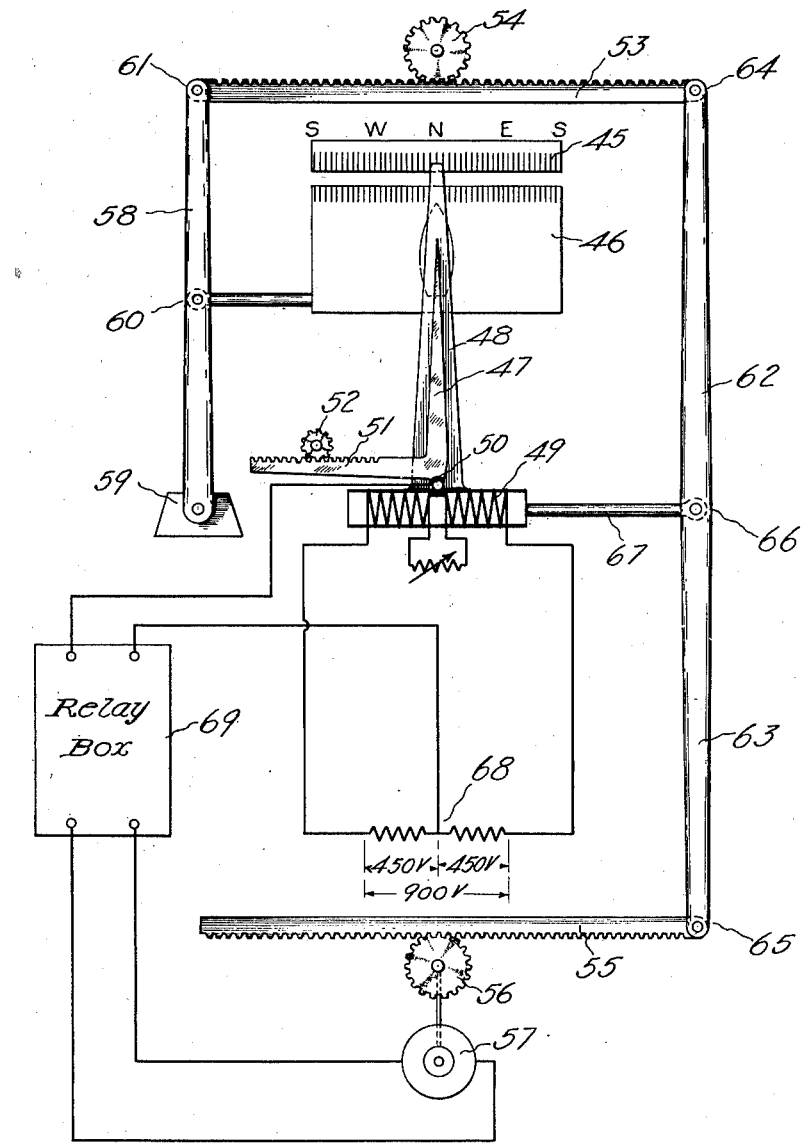

In the drawings, Figures 1 and 2 are a plan and an elevation in section, respectively, of one form of mechanism according to the invention and Fig. 3 is a schematic representation of the movable elements of the mechanism shown as somewhat fanciful racks and linkages instead of the actual gears used, the purpose of such showing being to assist in an understanding of the operation.

Referring to Figures 1 and 2, 1 is a ring calibrated in degrees and secured to the casing in which the device is mounted and therefore stationary with respect to the ship or any other mobile structure upon which the mechanism is mounted. Within the ring 1 there is a disc 2, also calibrated in degrees, and arranged to be angularly actuated by the ship's compass through tubular shaft 36 as explained below. The reading on the ring of the angular position of the 0° mark on the disc gives the ship's true bearing at all times since the outside ring is in effect a dummy compass card.

Riding over calibrated disc 2 there is a pointer 3 actuated by the hand-wheel 25 which the operator turns to initiate changes in the orientation of the trainable device. Operation of the hand-wheel also actuates arm 4 of the follow-up device which, in the structure described, is a balanced bridge potentiometer 5. When potentiometer 5 is thus unbalanced it causes the motor which rotates the trainable device to operate. This motor is not a part of the mechanism shown in Fig. 2 but the repeater motor 72 which is operated by the motor for rotating the trainable device is there shown. The rotation of the trainable device is transmitted back to internal gear 7, by means described below which, as will be explained, restores the balance of potentiometer 5.

Rotatable plate 8 is connected by hollow shaft 36 to resistance element 6 of potentiometer 5 and carries pinions 9 and 10 on jack-shaft 11. Pinion 9 engages internal gear 7 while pinion 10 engages gear 12. Pinions 9 and 10 constitute a planetary pair by which plate 8 is rotated by either internal gear 7 or gear 12, or by both simultaneously. Worm 14 is connected to be rotated by a repeater motor 71 operating from the ship's gyro-compass. Gyro-compass systems and repeaters therefor are well known and hence the gyro-compass and its transmitter for telemetering the change in bearing to the repeater 71 have not been shown in Fig. 2. Worm 14 thus drives gear 15 and also gear 12 since both gears are fixedly mounted on a common sleeve 16.

As the ship changes its course, the repeater motor for the ship's gyro-compass turns gear 12 and rotates plate 8 through pinion 10, thus rotating resistance element 6 of potentiometer 5 and unbalancing the potentiometer 5. This in turn operates the motor which rotates the trainable device to turn it in a manner to compensate for the turning of the ship. As the trainable device is rotated, its motion is transmitted back to internal gear 7 which produces opposite rotation of plate 8 to bring resistance element 6 of potentiometer 5 to rest at the balanced position when the trainable device has been restored to its original bearing.

When arm 4 of potentiometer 5 is rotated by the operator to change the bearing of the trainable device, the rotation of the device, transmitted back to internal gear 7, operates through pinion 9 to rotate plate 8 and resistance element 6 of potentiometer 5 to restore the balance of the potentiometer when the trainable device has been rotated to the desired new position as indicated by pointer 3.

The arrangement is such that when potentiometer resistance element 6 is in the balanced position its angular position with respect to ring 1 corresponds to the orientation of the trainable device, regardless of the true bearing of the ship. Thus pointer 13 which is connected to potentiometer resistance element 6 and plate 8 through a sleeve 36 indicates by reference to ring 1 the true bearing of the trainable device and, except during the brief interval required to change the orientation of the device, pointer 13 coincides with pointer 3.

Still referring to Figs. 1 and 2, worm 14 as previously explained is connected to the ship's gyro-repeater and drives worm-gear 15 which is mounted on sleeve 16 to which are also fixed gears 12 and 17. By suitable choice of its ratio with worm 14, worm-gear 15 is arranged to rotate relative to the frame of the device through twice the angle through which the ship turns and in the same sense. Jack-shaft 18, which carries pinions 19 and 20, turns in bearing 21 in plate 22, which is part of the frame of the mechanism. Pinion 19 meshes with gear 17 and has a 2 to 1 step up ratio with it. Gear 23 meshes with pinion 20 and has a 4 to 1 step down ratio with it. Gear 23 is connected to disc 2 by sleeve 24, and by reason of the ratios just described, disc 2 turns relative to the dial through the same angle as that executed by the ship and in the same sense.

Pinions 9 and 10 have 1 to 3 step up ratios to internal gear 7 and gear 12, respectively, although any other convenient equal ratios could be employed. Thus, if internal gear 7 is stationary, plate 8 will be turned through one half the angle executed by gear 12 and in the same sense. Similarly, if gear 12 is stationary, plate 8 will be turned through half the angle executed by internal gear 7 and in the same sense. As already explained, gear 12 is turned through twice the angular change in the ship's course and in the same sense by the gyro-repeater. Similarly, internal gear 7 is turned through twice the angle through which the trainable device turns on the ship and in the same sense. Thus plate 8 is maintained in a position with respect to the ring 1 corresponding to the true bearing of the trainable device, which bearing may thus be read directly upon calibrated ring 1 by means of pointer 13.

In the embodiment shown in Fig. 2, hand-wheel 25 (omitted in Fig. 1) drives shaft 26 through sprockets 27 and 28 and chain 29. Worm 30 on shaft 26 drives worm-wheel 31 on shaft 32 on which are mounted arm 4 of potentiometer 5, and pointer 3. Shaft 32 is journaled in bearing 33 in plate 34 which is part of the frame of the mechanism, and is supported at its upper end by sleeve 35. Tubular shaft 36 is journaled in bearing 37 on plate 38 which is part of the frame of the mechanism. Tubular shaft 36 carries resistance element 6 of potentiometer 5, plate 8 and pointer 13. Internal gear 7 is supported on plate 39 which has a hub 40 on which is mounted worm-gear 41, which in turn engages worm 42 driven by a repeater motor 72 whose rotation is controlled by rotation of the trainable device. Hub 40 is journaled upon an extension 43 of bearing 37. Sleeve 16 carrying worm-wheel 15 and gears 12 and 17 turns freely on bearing 44 which is secured to plate 22.

It will be noted that the disc 2 has an approximate outline of the ship's hull engraved upon its upper surface to enable the operator to visualize the situation at any instant without regard to the true bearing of the ship itself. The relation of pointers 3 and 13 to the outline of the ship provides a virtual picture of the position of the trainable device with respect to the ship. Assuming that the zero mark at the top of the scale on ring 1 represents north, then, as shown in Fig. 1: (1) the ship's course is due north, as indicated by the ship's outline, (2) the desired bearing for the trainable device is 250°, which is 20° south of due west, as indicated by the pointer 3, (3) the immediate bearing of the trainable device is due west, as indicated by the pointer 13, (4) the potentiometer is unbalanced by 20°, (5) the motor for rotating the trainable device (not shown) is energized and is turning the trainable device to the left, (6) when the trainable device has turned on the ship to the desired bearing the motor will stop and the pointer 13 will be in alinement with pointer 3, (7) the orientation of the trainable device will then be at 250° and (8) the indication of this orientation by the pointers 3 and 13 on the ring 1 will persist until the trainable device is again influenced to bear in a different direction by turning the hand-wheel.

When the operator is not turning the hand-wheel, it is only the change in the orientation of the ship that can change the appearance of the dial face, and such change in appearance is evidenced merely by the angular displacement of the disc 2. Thus whenever the operator needs to know it, the true bearing of the ship is apparent. The operator, however, is primarily concerned with the true bearing of the trainable device as shown by the pointer 13.

When the operator turns the hand-wheel, pointer 3, being controlled thereby, moves immediately to a new position on ring 1, thus indicating in advance the new bearing desired for the trainable device, whereupon the pointer 13 follows along and comes to rest with the pointer 13 in alinement with the pointer 3.

The several gear movements may be briefly summarized as follows:

For indicating the orientation of the ship—gears 15 and 17, driven by the ship's gyro-compass repeater, turn in the same sense as and, relative to the frame of the device, through twice the angle of the ship's turning movement or (2s) where s represents a given angle of turning of the ship. Pinions 19 and 20 turn in the opposite sense to and through twice the angle of movement of gears 15 and 17, (−2). Gear 23 and disc 2 turn in the opposite sense to and through one fourth the angle of movement of gears 19 and 20, (−¼), and, therefore, in the same sense as and, relative to the frame and ring 1, through the same angle as that of the ship's turning movement. The product of these factors $(2s) \times (-2) \times (-¼) = s$. The ship outline on disc 2 thus indicates on the scale of fixed ring 1 the orientation of the ship.

For indicating the true bearing of the trainable device—

Gears 15 and 12 turn in the same sense as and through twice the angle of the ship's turning movement, (2s). Plate 8, which carries the planetary pair, the pinions 9 and 10, potentiometer 5 and pointer 13 turn in the same sense as and through half the angular movement of gears 15 and 12, (½). The resulting unbalance of the potentiometer causes the motor for the trainable device to turn the trainable device in a reverse direction to the turning movement of the ship and through the same angle. Thereupon gears 41 and 7 turn in the opposite sense to and through twice the angle through which the potentiometer had turned, (−2s). This causes the potentiometer to turn in the same sense as and through half the angular movement of the gears 41 and 7, (½). The algebraic sum of these movements, $(2s) \times (½) + (-2s) \times (½) = 0$. The pointer 13 thus tends to remain in its initial position on the scale of ring 1, indicating the same bearing of the trainable device as before the ship began its turning movement.

For a better understanding of the operation of the mechanism of the invention, reference is made to Fig. 3 which is a diagrammatic representation wherein some of the gears of the mechanism of Figs. 1 and 2 have been replaced by levers having essentially the same action, and wherein some of the rotary motions of Figs. 1 and 2 are represented by translatory motions.

Referring to Figs. 1, 2 and 3, respectively, ring 1 is represented by bar 45, disc 2 by plate 46, pointer 3 by pointer 47 and pointer 13 by pointer 48. Resistance element 6 of potentiometer 5 is shown diagrammatically at 49 and contact member 4 is shown diagrammatically at 50. The shaft 32, worm-wheel 31, worm 30 and jack-shaft 26, sprocket 28, chain 29, and sprocket 27 by which contact arm 4 and pointer 3 are rotated in unison are represented in Fig. 3 by rack 51 and pinion 52 to which latter the hand-wheel 25 may be assumed to be attached.

Rack 53 represents worm-wheel 15 and gears 12 and 17, while pinion 54 represents worm 14, and is assumed to be driven by the ship's gyro-compass. Similarly, rack 55 represents worm-wheel 41 and internal gear 7, while pinion 56 represents worm 42 and is shown mechanically connected to the training motor shown diagrammatically at 57. 57 may be taken to represent either the repeater motor 72, Fig. 2, the motor for rotating the trainable device (not shown in Fig. 2) or both since one follows the other. Lever 58 represents pinions 19 and 20, is fulcrumed at its lower end 59, connected at its mid-point 60 to plate 46 and at its upper end 61 to rack 53. Rack 53 and pinion 54 are so chosen that the motion of rack 53 corresponds to twice the angular motion of the ship. Lever 58 reduces the motion of rack 53 as applied to plate 46, so that plate 46 moves an amount equivalent to the angular motion of the ship.

The two equal sections 62 and 63 of the lever at the right in the diagram, Fig. 3, shown as pivotally connected at 64 to rack 53 and at 65 to rack 55, respectively, and at its mid-point 66 to an arm 67, represent the planetary gear train 10—9, Fig. 2, which are driven by the gears 12 and 7. The arm 67 represents the plate 8 and operates to move the potentiometer resistance element 49 to the right or left when acted upon by an angular rocking movement of the lever 62, 63 upon the turning of one or the other of the pinions 54, 56.

Also shown in Fig. 3 is a simplified diagram of the circuits of the resistance element 49 and the relation thereof to the motor 57 and a divided source 68 of direct current. The two sections of the resistance 49 and the two sections of the source of current 68 are in the four arms of a Wheatstone bridge. A control, or relay, box 69, the output of which extends to the motor 57, is in the bridge arm. The motor is thus energized to turn the trainable device in one angular direction or the other according to the right or left position of the contact 50 on the resistance 49 when away from its balanced or neutral position.

By reference to Fig. 3 is will be easily noted that when the ship is not turning and rack 55 is stationary any turning of the hand-wheel will cause rack 51 to be moved thereby causing contact 50 to slide into contact with one section or the other of the resistance 49. This unbalances the potentiometer whereupon direct current flows from the source 68 through the bridge arm into the control box 69 in the proper direction to turn the motor 57 and the trainable device and pinion 56 and to move the rack 55 laterally. This causes the lever 62, 63 to rock on 64 as a pivot and the arm 67 to move one half as far as the rack 55 to bring the resistance 49 again into balance with the new position of the contact 50.

Reversely, when the hand-wheel and rack 51 are stationary, the turning of the ship causes rack 53 to move laterally. As stated, plate 46 thereupon moves one half as far as the rack. At the same time lever 62, 63 is rocked on 65 as a pivot and arm 67 is moved half as far as the rack 53. This likewise unbalances the potentiometer and again excites motor 57 whereupon rack 55 rocks the lever 62, 63 on 64 as its pivot in the angular direction opposite to that just caused by the rack 53 to restore the resistance element 49 to its balanced condition.

Having thus described our invention what we claim is:

1. A control and indicating apparatus for use on a carrier having a trainable device, motor means for turning said device in either azimuthal angular direction and a compass, comprising an electrical system for energizing said motor means including a potentiometer having cooperating angularly adjustable resistance and contact members and having a balanced condition in which said motor means is inactive and two unbalanced conditions in which said motor means is caused to turn said trainable device in either of the two angular directions respectively, manual means to adjust one of said potentiometer members, a graduated scale, a movable element related to said scale to indicate the true bearing of said carrier, a second movable element related to said scale and connected to move in synchronism with the other of said potentiometer members to indicate the true bearing of said device, a repeater governed by said compass for controlling the adjustment of the first mentioned movable element, a second repeater governed by said trainable device, and a differential mechanism under the joint control of said repeaters and in turn controlling the adjustment of the other of said potentiometer members.

2. A control and indicating apparatus for use on a carrier having a trainable device, motor means for turning said device in either azimuthal angular direction and a compass, comprising an electrical system for energizing said motor means including circuit closing means having cooperating independently adjustable members and having a neutral condition in which said motor means is inactive and two conditions in which said motor means is caused to turn said trainable device in either of the two directions respectively, manual means to adjust one of said members, a graduated scale, a movable element related to said scale to indicate the true bearing of said carrier, a second movable element related to said scale and connected to move in synchronism with the other of said adjustable members to indicate the true bearing of said device, a repeater governed by said compass for controlling the adjustment of the first mentioned movable element, a second repeater governed by said trainable device, and a differential mechanism under the joint control of said repeaters and in turn controlling the adjustment of the said other adjustable member.

3. A control and indicating apparatus for use on a carrier having a trainable device, motor means for turning said device in either azimuthal angular direction and a compass, comprising an electrical system for energizing said motor means including circuit closing means having two independently adjustable cooperating members and having a neutral condition in which said motor means is inactive and two other conditions in which said motor means is caused to turn said device in either of the two angular directions respectively, manual means to adjust one of said members, a graduated scale, a movable element related to said scale to indicate the true bearing of said carrier, a second movable element related to said scale and connected to move in synchronism with the other of said members to indicate the true bearing of said device, a third movable element related to said scale and connected to move in synchronism with the member adjustable by said manual means to indicate the desired bearing of said device, a repeater governed by said compass for controlling the adjustment of the first mentioned movable element, a second repeater governed by said trainable device, and a differential mechanism under the joint control of said repeaters and in turn controlling the adjustment of said other member.

4. A control and indicating apparatus for use on a carrier having a trainable device and a compass, comprising a graduated scale, a movable element related to said scale to indicate the true bearing of said carrier, a second movable element related to said scale to indicate the true bearing of said device, a third movable element related to said scale, manual means to adjust said third movable element to indicate the desired bearing of said device, driving means governed by said compass for controlling the adjustment of the first mentioned movable element, driving means governed by said trainable device, a differential mechanism governed by both of said driving means for controlling the adjustment of said second movable element, and electrical means including a motor jointly controlled by said manual means and said differential mechanism to adjust the bearing of said device.

5. Apparatus for maintaining a trainable device at a constant true bearing irrespective of a change in bearing of a carrier for said device comprising, means including a manual control member for rotating the trainable device in azimuth to a selected true bearing, means responsive to a predetermined change in bearing in one direction of said carrier to actuate said means for rotating the trainable device to rotate the latter by an amount equal to the change in bearing of said carrier but in the opposite sense whereby the true bearing of the trainable device is maintained constant, a stationary ring bearing compass graduations, a disc member having bearing graduations, means for rotating said disc member relative to said ring in accordance with changes in bearing of said carrier to indicate true bearing, a first pointer rotatable with said trainable device over said ring and disc member to indicate respectively both the true bearing of said trainable device and its bearing relative to that of said carrier, and a second pointer rotatable by said manual control member over said disc member to indicate a newly selected true bearing for said device.

6. Apparatus for maintaining a trainable device at a constant true bearing irrespective of a change in bearing of a carrier for said device comprising, means including a manual control member for rotating the trainable device in azimuth to a selected true bearing, means responsive to a predetermined change in bearing in one direction of said carrier to actuate said means for rotating the trainable device to rotate the latter by an amount equal to the change in bearing of said carrier but in the opposite sense whereby the true bearing of the trainable device is maintained constant, a stationary ring bearing compass graduations, a disc member having bearing graduations, means for rotating the disc member relative to said ring in accordance with changes in bearing of said carrier to indicate true bearing, a first pointer rotatable with said trainable device over said ring and disc member to indicate respectively both the true bearing of said trainable device and its bearing relative to that of said carrier, and a second pointer in geared ratio with and rotatable by said manual control member over said disc member to indicate a predetermined angle of rotation of said device.

7. The apparatus of claim 6 wherein the control member included in the means for rotating the trainable device in azimuth to a selected true bearing comprises a manually operable hand wheel.

J. WARREN HORTON.
ROBERT A. WAGNER.

References Cited in the file of this patent

UNITED STATES PATENTS

| Number | Name | Date |
|---|---|---|
| 1,215,425 | Sperry | Feb. 13, 1917 |
| 1,296,439 | Sperry | Mar. 4, 1919 |

FOREIGN PATENTS

| Number | Country | Date |
|---|---|---|
| 594,563 | France | June 27, 1925 |